United States Patent
Beavis et al.

(10) Patent No.: US 8,528,683 B2
(45) Date of Patent: Sep. 10, 2013

(54) SNOWMOBILE CHASSIS WITH TUNNEL

(75) Inventors: Andrew Beavis, Goodridge, MN (US); Jonathon Edwards, Viking, MN (US); Ken Fredrickson, Thief River Falls, MN (US); Ronald Bergman, Mentor, MN (US)

(73) Assignee: Artic Cat Inc., Thief River Falls, MN (US)

( * ) Notice: Subject to any disclaimer, the term of this patent is extended or adjusted under 35 U.S.C. 154(b) by 180 days.

(21) Appl. No.: 13/028,993

(22) Filed: Feb. 16, 2011

(65) Prior Publication Data

US 2012/0205902 A1    Aug. 16, 2012

(51) Int. Cl.
*B62D 21/00* (2006.01)
*B62M 27/00* (2006.01)

(52) U.S. Cl.
USPC ............................ 180/312; 180/311; 180/190

(58) Field of Classification Search
USPC ................................. 180/89.1, 311, 312, 190
See application file for complete search history.

(56) References Cited

U.S. PATENT DOCUMENTS

| | | | |
|---|---|---|---|
| 5,944,133 A * | 8/1999 | Eto | 180/190 |
| 7,775,313 B1 * | 8/2010 | Sampson et al. | 180/190 |
| 8,191,665 B1 * | 6/2012 | Sampson et al. | 180/190 |
| 2001/0027890 A1 * | 10/2001 | Bria et al. | 180/291 |
| 2002/0100631 A1 * | 8/2002 | Nishijima | 180/312 |
| 2003/0029663 A1 * | 2/2003 | Etou | 180/312 |
| 2004/0026153 A1 * | 2/2004 | Dershem et al. | 180/311 |
| 2005/0126839 A1 | 6/2005 | Rasidescu et al. | |
| 2005/0205320 A1 * | 9/2005 | Girouard et al. | 180/190 |
| 2006/0085966 A1 * | 4/2006 | Kerner et al. | 29/524.1 |
| 2006/0108164 A1 * | 5/2006 | Wubbolts et al. | 180/190 |
| 2007/0062751 A1 | 3/2007 | Rasidescu et al. | |
| 2008/0277184 A1 * | 11/2008 | Marleau | 180/312 |
| 2010/0288574 A1 | 11/2010 | Rasidescu et al. | |

* cited by examiner

*Primary Examiner* — Paul N Dickson
*Assistant Examiner* — Barry Gooden, Jr.
(74) *Attorney, Agent, or Firm* — Lowe Graham Jones PLLC

(57) ABSTRACT

A snowmobile chassis includes dual panels that form a lighter weight and stronger tunnel preferably without the need for structural doublers, plates or other attachable reinforcement devices. The dual panels take the form of inner and outer panels coupled together with selective gaps or spaces located between the panels. The gaps laterally separate the panels and may be continuous and take a variety of shapes as defined by each panel's configuration. The arrangement of the gaps may advantageously define a desired structural load path through the tunnel, increase a section modulus with respect to a centerline of the tunnel, and reduce an overall weight of the tunnel as compared with conventional tunnels that utilize added reinforcement devices.

24 Claims, 9 Drawing Sheets

SNOWMOBILE CHASSIS WITH TUNNEL

FIELD OF THE INVENTION

This invention relates generally to a chassis for a snowmobile and, more specifically, to a chassis that includes a tunnel having inner and outer side panels with laterally spaced apart regions.

BACKGROUND OF THE INVENTION

Modern snowmobiles typically have two skis for supporting the front of the machine and to provide steering and a rubber track for supporting the rear of the machine and to provide traction force. The rider is typically positioned anywhere from directly over the center of the track to over the front of the track, while the engine is located between the drive track and the skis, usually as low as possible.

A snowmobile is considered to be an off-road vehicle and as such it must be able to contend with many different riding environments. The terrain may change from smooth trails to large bumps and jumps. Snow conditions can vary from grippy hard-pack to bottomless powder, from smooth trails to rough and bumpy ones. The basic platform for a conventional snowmobile includes three components, a tunnel at the rear of the snowmobile, an engine cradle connected at the front of the tunnel, and a front suspension connected to the engine cradle. The three components are integrally connected to form a unitary structure that is rigid enough to withstand the forces impingent thereupon during operation of the snowmobile. A rear track suspension is mounted to the underside of the snowmobile within a tunnel that partially encloses the track and suspension. A seat for the snowmobile rider is provided on top of the tunnel and running boards are provided on either side for supporting the rider's feet.

One type of conventional tunnel is described in U.S. Patent Publication No. 2010/0288574, which shows the tunnel as essentially an inverted, U-shaped structure. The tunnel has a top portion, a left side portion, and a right side portion. A left side running board extends outwardly from the left side portion of the tunnel. Likewise, a right side running board (not shown) extends outwardly from the right side portion of the tunnel.

The conventional tunnel in the above-identified published patent application exemplifies other known tunnel configurations utilized in modern snowmobiles. For such tunnels, the left and right side portions are made from single panels or sheets. Because of the amount of load (e.g., static, dynamic, vibrational, high impact, etc.) carried by the chassis it is typically necessary to attach plates, doublers or other structural stiffening or reinforcing devices to the single panels for load path routing, local reinforcement reasons, or both. In some tunnel configurations, structural or weight removing features such as ribs, channels, or lightning holes may be formed in the single panels.

SUMMARY OF THE INVENTION

The present invention relates to a snowmobile chassis and, more specifically, to a snowmobile chassis having a lighter weight and stronger tunnel, preferably without the need for additional structural doublers, plates or other attachable reinforcement devices. The tunnel includes inner and outer panels coupled together with selective gaps or spaces located between the panels. The arrangement of the gaps may advantageously define a desired structural load path through the tunnel, increase a section modulus with respect to a centerline of the tunnel, and reduce an overall weight of the tunnel as compared with conventional tunnels that utilize added reinforcement devices.

In accordance with an aspect of the invention, a chassis for a snowmobile includes a front suspension assembly and a rear suspension assembly. The rear suspension assembly is coupled to the front suspension assembly and includes a tunnel preferably having a footrest. The tunnel is made up of an inner panel and an outer panel coupled to the inner panel. In the preferred embodiment, at least one of the panels is coupled to the footrest. Alternatively the footrest may be separately attached to the chassis. A first region of the tunnel includes the panels arranged such that the inner and outer panels are laterally spaced apart from each other while a second region of the tunnel is arranged with the inner and outer panels being in contact.

In accordance with another aspect of the invention, a chassis tunnel for a snowmobile includes side inner and outer panels coupled to one another. In one preferred aspect, a running board is also secured to one of the side panels. At least one structural region is formed by the panels where the panels are laterally spaced apart from each other. A proximate structural region is also formed with the panels being in contact with each other. An upper panel is coupled to at least one of the side panels, the top panel extending approximately in a lateral direction relative to the side panels.

In accordance with yet another aspect of the invention, a method for making a chassis of a snowmobile includes the steps of (1) obtaining an inner side panel that extends rearward relative to a direction of travel of the snowmobile, wherein a foremost portion of the inner side panel is located in front of a drive shaft cutout in the tunnel; (2) obtaining an outer side panel; (3) assembling the outer side panel with the inner side panel to form a sidewall, wherein at least one region of the sidewall includes the panels laterally spaced apart; (4) coupling an upper panel to one of the side panels; and (5) coupling a running board to one of the side panels.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

As will be described in further detail below, at least one embodiment of the invention includes is a snowmobile having a lighter weight and stronger tunnel, which forms part of the snowmobile's chassis. The tunnel includes inner and outer panels coupled together with selective gaps or spaces located between the panels. The arrangement of the gaps may advantageously define a desired structural load path through the tunnel, increase a section modulus with respect to a centerline of the tunnel, and reduce an overall weight of the tunnel as compared with conventional tunnels that utilize added reinforcement devices.

Figure 1:
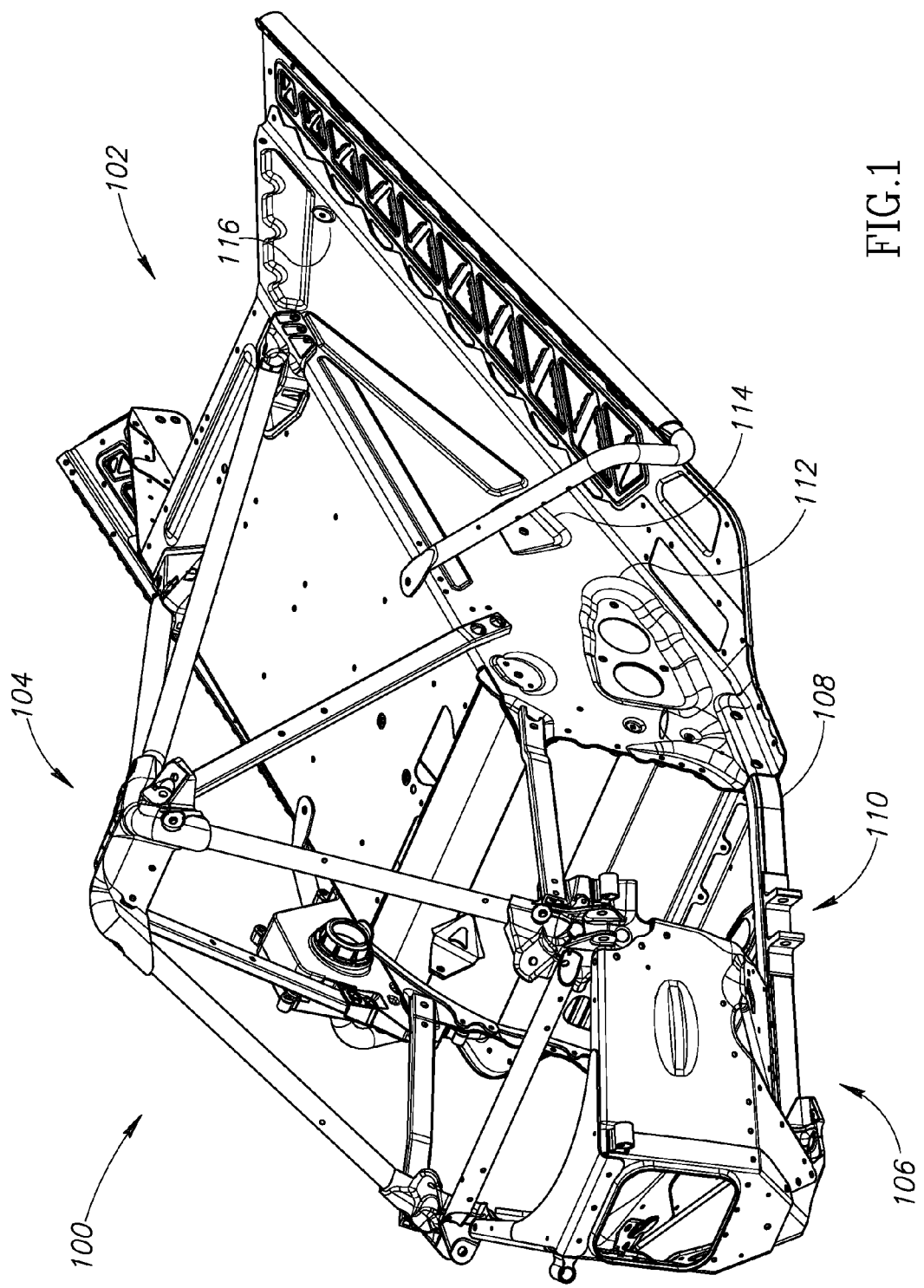
FIG. 1 is an isometric view of a chassis for a snowmobile according to an embodiment of the present invention.

FIG. 1 shows a chassis 100 for a snowmobile according to an embodiment of the present invention. The chassis 100 includes a tunnel 102, an upper chassis frame 104, and an engine cradle frame 106. Although not illustrated, the upper chassis frame 104 provides structural support and/or attachment with components such as, but not limited to, the steering assembly and seating assembly. The engine cradle frame 106 is configured to form a space for receiving the engine (not shown) and also includes a front suspension support spar 108 that engages the tunnel 102. A front suspension system (not shown) attaches to the spar 108 at mounting location 110, which may take the form or a bracket, lug, etc. In the illustrated embodiment, the tunnel 102 includes a reinforced cutout region 112 having an opening for a track shaft (not shown). The tunnel also includes a forward mounting location 114 for a rear suspension system (not shown) and an aft mounting location 116 for the rear suspension system.

Figure 2:
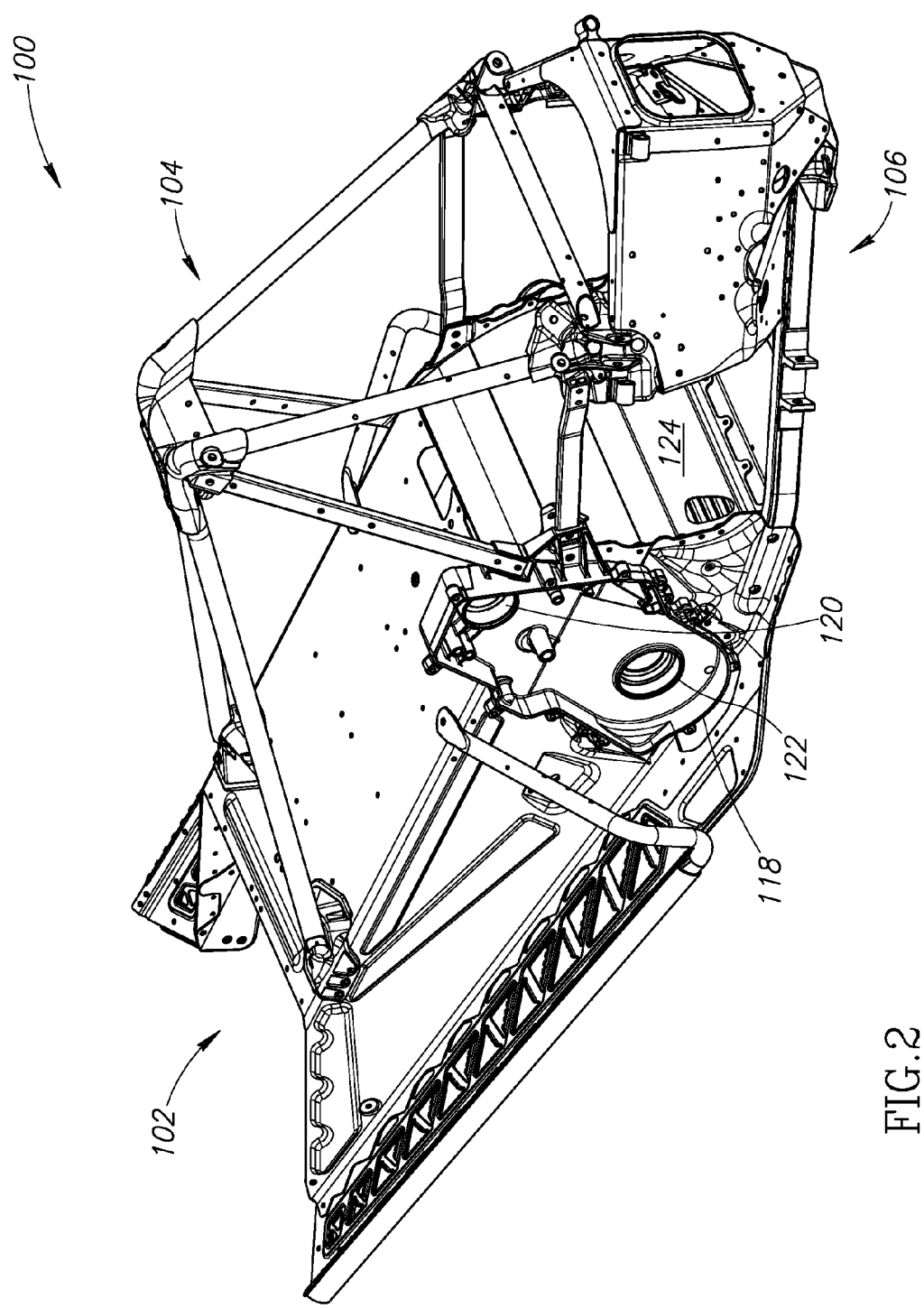
FIG. 2 is another isometric view of the chassis of FIG. 1.

FIG. 2 shows a right side of the chassis 100. A drive drop case assembly 118 is received into the tunnel 102 and provides a driven shaft opening 120 (upper opening) and a drive sprocket/track shaft opening 122 (lower opening). Further, the tunnel 102 may include a front tunnel wall 124 that closes off the front of the tunnel and prevents snow or other debris kicked up from the track (not shown) from impacting the engine (not shown). The wall may also secure a heat exchanger.

Figure 3:
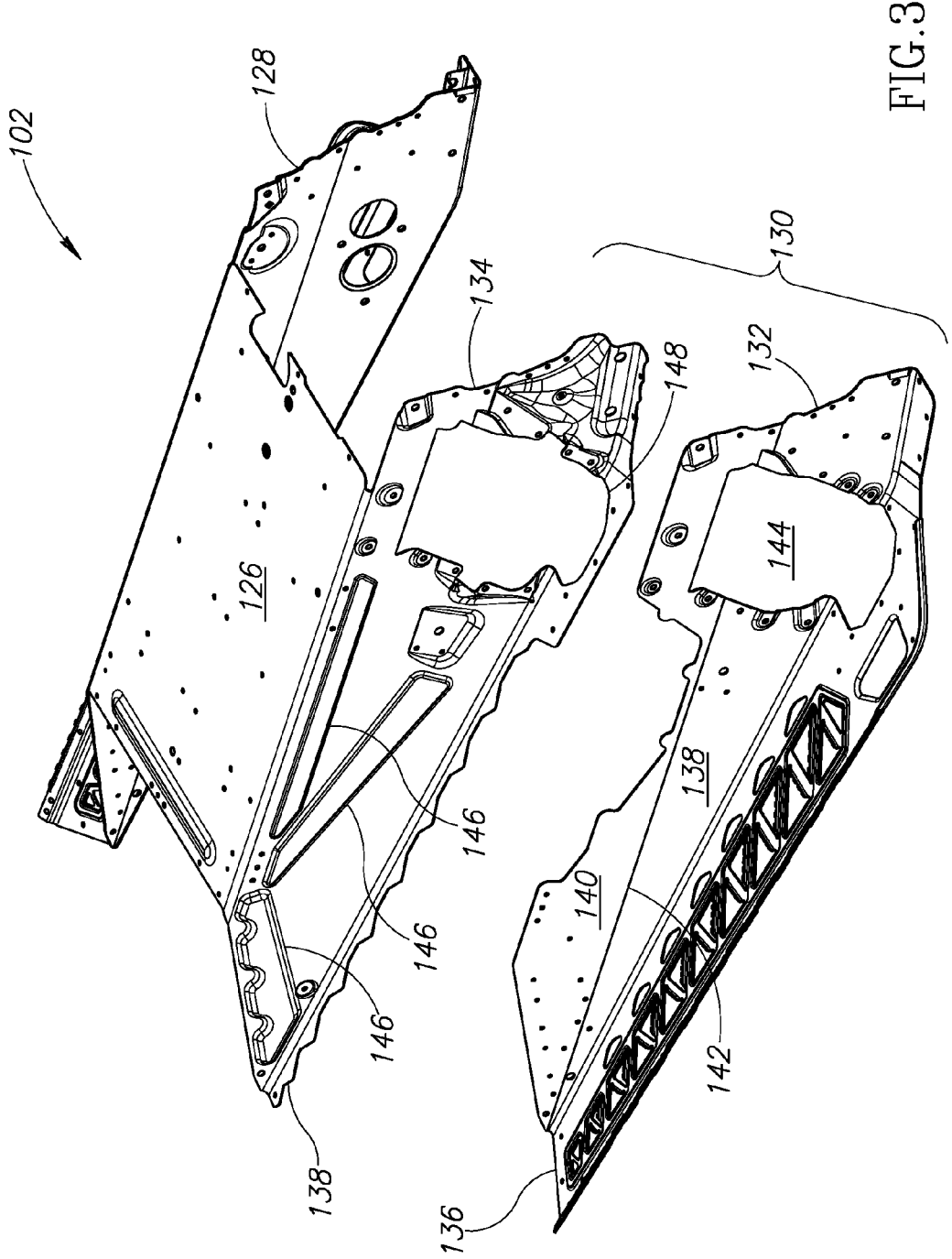
FIG. 3 is a partial, exploded view of a tunnel of the chassis of FIG. 1 according to an embodiment of the present invention.

FIG. 3 shows a partially exploded view of the tunnel 102. For purposes of clarity, the tunnel 102 includes three primary portions, an upper panel 126, a left-side panel 128 (shown in an assembled configuration), and a right-side panel 130 (shown in an exploded configuration). For purposes of the description herein the focus will be on the right-side panel 130, but it is understood that many, if not all, of the aspects and features or variations thereof in the right-side panel may also be found in the left-side panel 128.

The right-side panel 130 includes an inner panel 132 and an outer panel 134. The inner panel 132 includes a footrest, preferably in the form of a running board 136, coupled to a lower section 138, which in turn extends into an upper section 140. The lower and upper sections 138, 140 may be angled relative to each other along a break line 142. Such a configuration permits the side panels 128, 130 to either flare out or taper in proximate the running board 136 instead of being substantially vertical. The inner panel 132 includes a cutout 144 to receive the drive drop case assembly 118 (FIG. 2). Alternatively, the running board may be formed independent of the tunnel panels 132, 134. It may be made of similar or different material from the tunnel. For example, the running boards are made of composite materials in one embodiment. In such an alternate embodiment, such footrest or running board is attached to the chassis, ideally directly to bottom portions of the tunnel. Furthermore, other portions of the chassis tunnel may be made from various materials, such as plastics and composites.

The outer panel 134 includes a lip 148 that couples to the running board 136 when the inner and outer panels 132, 134 are assembled. In the illustrated embodiment, the outer panel 134 includes integrated ribs 146 arranged to direct loads through the tunnel 102 in a desired manner. Further, the outer panel 134 includes a cutout 148 shaped identical to or approximately close to the cutout 144 of the inner panel 130 because the drive drop case assembly 118 (FIG. 2) would be received by both cutouts 144, 148, respectively.

Figure 4:
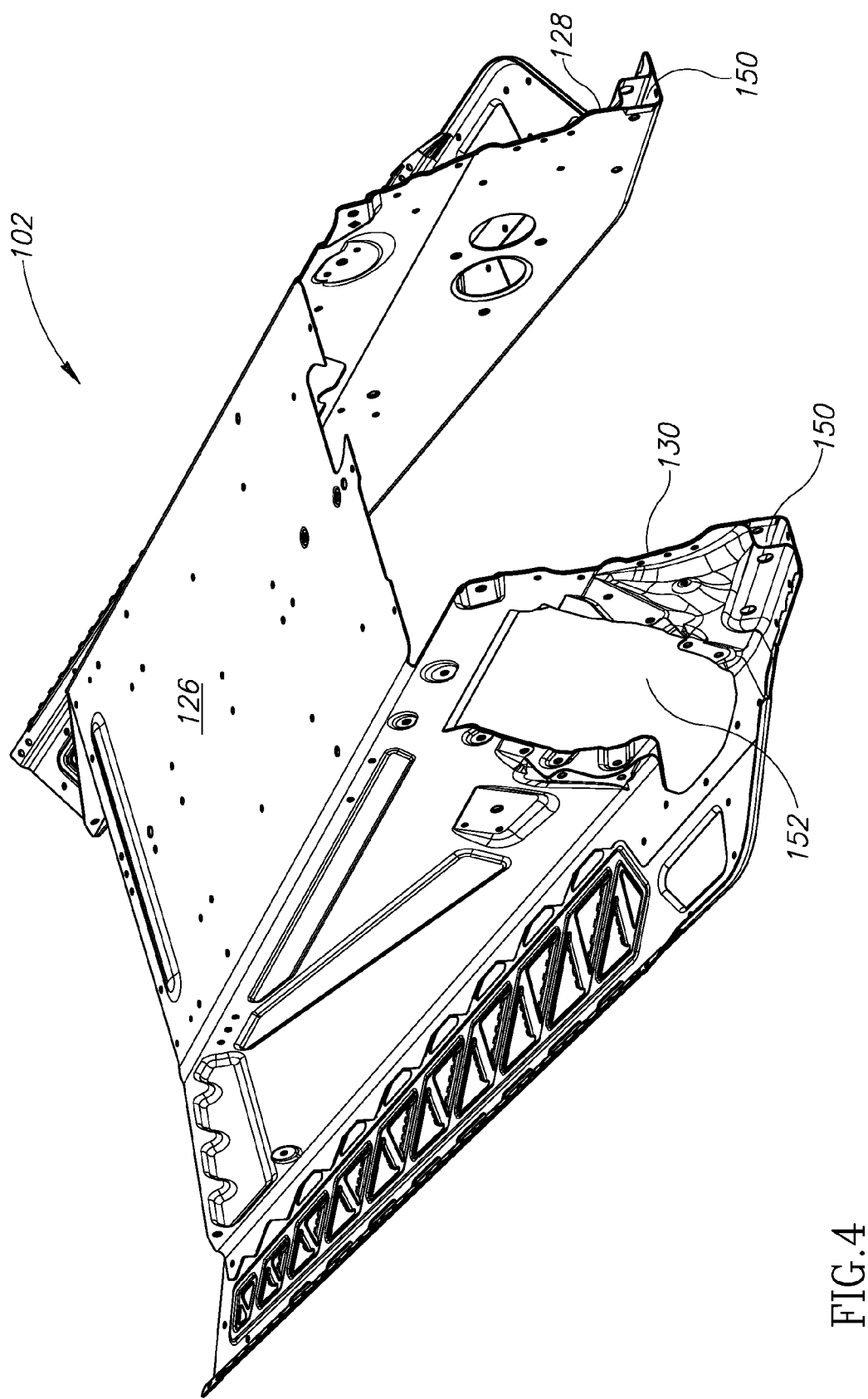
FIG. 4 is an isometric view of the tunnel of the chassis of FIG. 1.

FIG. 4 shows the tunnel 102 in an assembled configuration. After assembly, the panels 132, 134 (FIG. 3) may form a channel 150 sized to receive the spar 108 (FIG. 1) of the engine cradle frame 106 (FIG. 1). The channel 150 is located in front of a drive drop case assembly opening 152.

Figure 5:
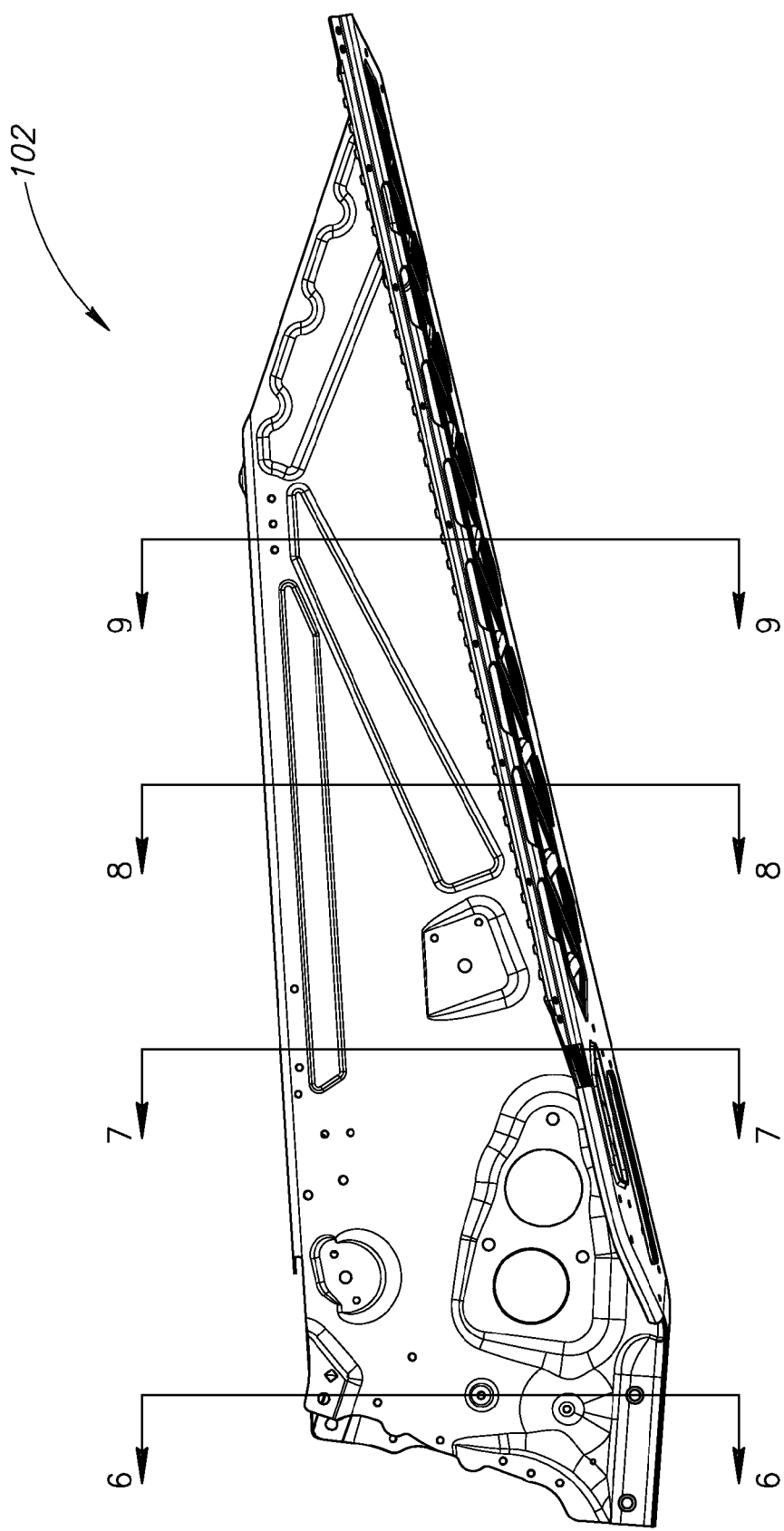
FIG. 5 is a side elevational view of the tunnel of FIG. 4.

FIG. 5 shows a side elevational of the tunnel 102 with a view of the left-side of the tunnel 102. Various cross-sectional cuts are taken at various locations along a length of the tunnel 102. These cuts were taken to illustrate how the panels 132, 134 (FIG. 3) interact and operate once they have been assembled together.

Figure 6:
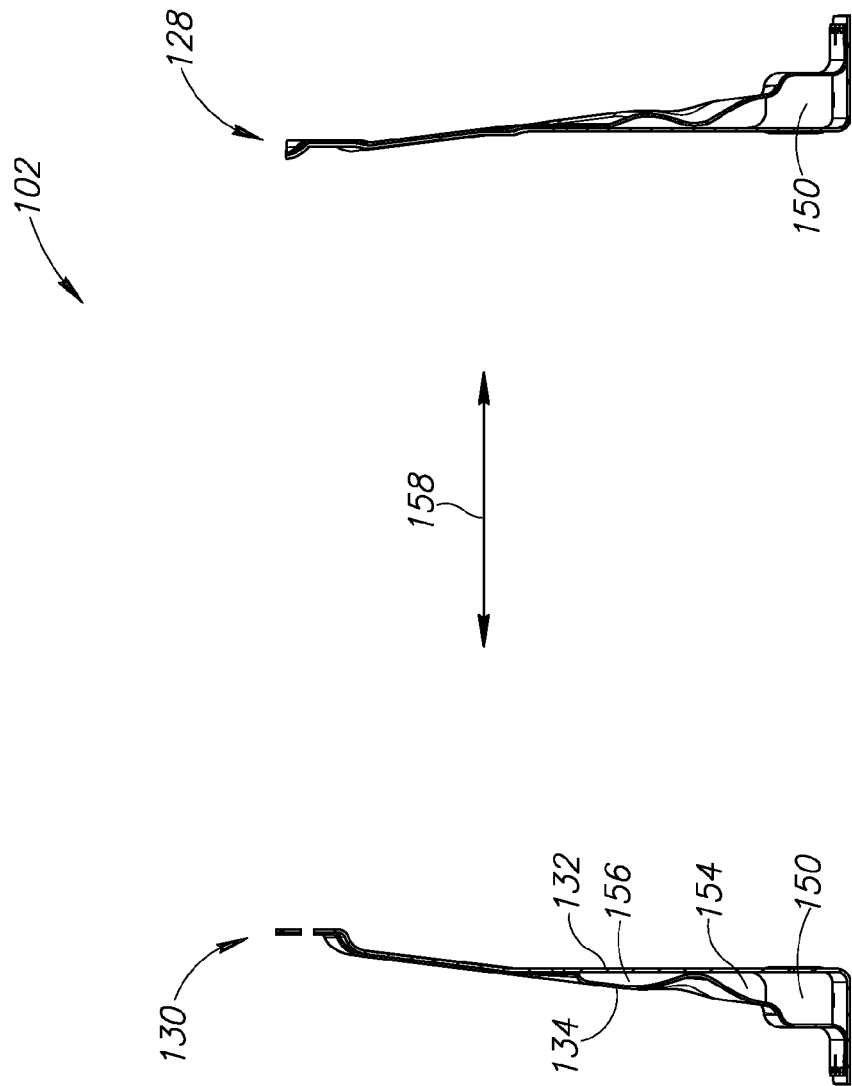
FIG. 6 is a cross-sectional view of the tunnel of FIG. 4 taken along LINE 6-6 of FIG. 5.

FIG. 6 shows a portion of the tunnel 102 resulting from the foremost cross-sectional cut along LINE 6-6 from FIG. 5. Again and for purposes of brevity, only the aspects and features of the right-side panel 130 will be described in detail. For the most part, the left-side panel 128 may be considered to be a mirror image (approximately). The inner and outer panels 132, 134 are configured to form the channel 150 as mentioned above. In addition, these panels 132, 134 may be configured to provide additional gaps or spaces such as the lower gap 154 and the upper gap 156 shown in the illustrated embodiment. The gaps 154, 156 separate the panels 132, 134 in approximately a lateral direction as indicated by lateral arrow 158.

Figure 7:
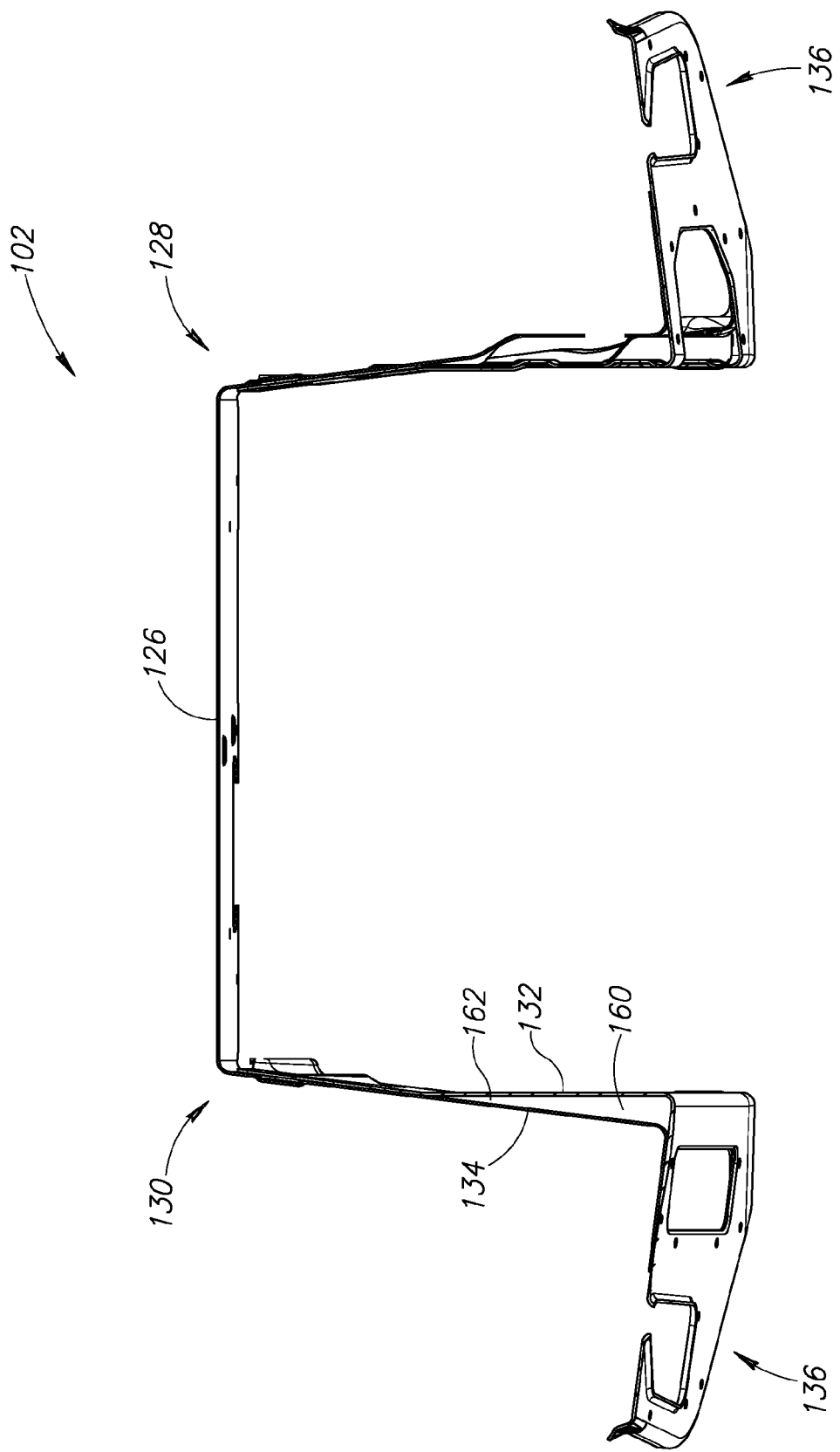
FIG. 7 is a cross-sectional view of the tunnel of FIG. 4 taken along LINE 7-7 of FIG. 5.

FIG. 7 shows another portion of the tunnel 102 resulting from the next cross-sectional cut along LINE 7-7 from FIG. 5. In this view, the inner and outer panels 132, 134 are configured to form a gap 160, which takes the form of a tapered gap that is wider toward the bottom and narrower where the panels 132, 134 come into contact with each other. In the illustrated embodiment, an apex 162 of the gap 160 may be at or proximate to the break line 142 (FIG. 3). Although the gap 160 is illustrated as being tapered, it is appreciated that the gap 160 may take other forms, for example it may have more of a rectangular or box shape, it may not be continuous lengthwise along the tunnel 102, or it may take more of a sinusoidal shape similar to the gaps 154 and 156 of FIG. 6. Any of these variations or combinations thereof may be possible depending on the design requirements of the tunnel 102. This selective separation of the panels 132, 134 may advantageously provide an adequate section modulus while reducing an overall weight of the tunnel 102. Weight may be reduced, as the thickness of the individual tunnel panels may be reduced. Furthermore, the weight is reduced by eliminating transition plates between the tunnel and the engine cradle. The layered tunnel provides the coupling regions and strength to join the frame spars to the tunnel without the need for the additional heavy-duty side plates.

Figure 8:
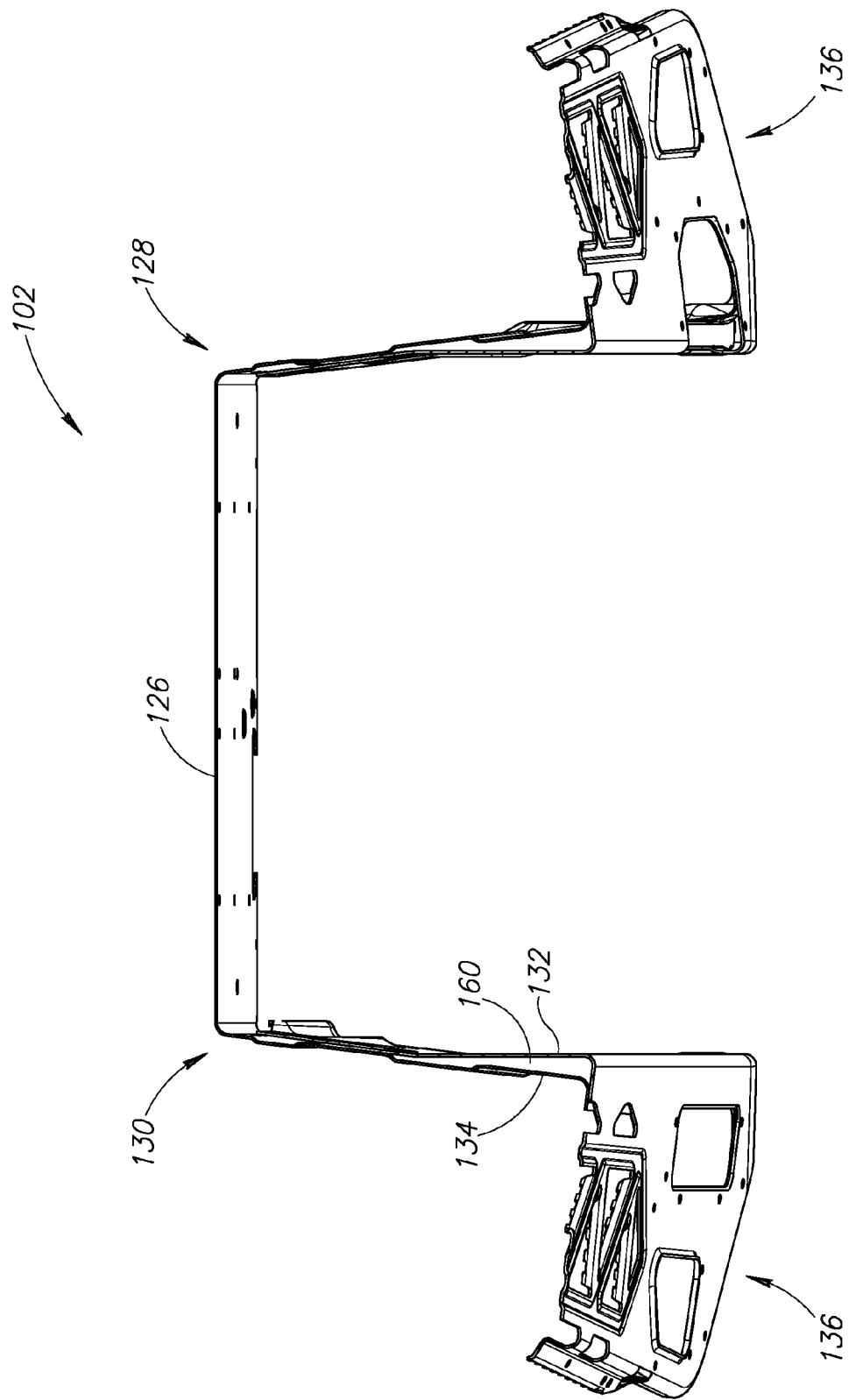
FIG. 8 is a cross-sectional view of the tunnel of FIG. 4 taken along LINE 8-8 of FIG. 5.
Figure 9:
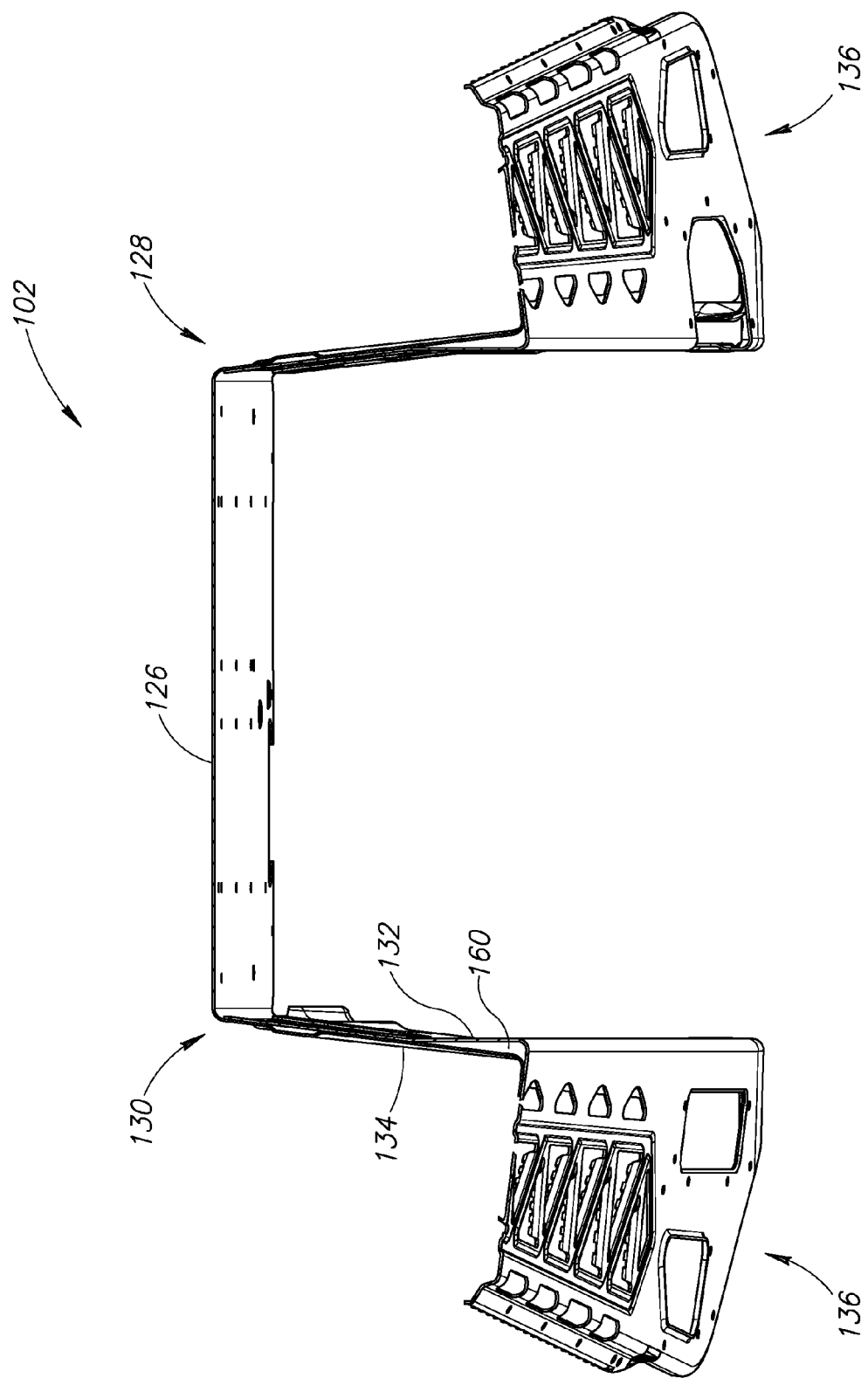
FIG. 9 is a cross-sectional view of the tunnel of FIG. 4 taken along LINE 9-9 of FIG. 5.

FIGS. 8 and 9 show two other portions of the tunnel 102 and indicate that the gap 160 may extend lengthwise along the tunnel in a continuous, uninterrupted manner. The amount of separation between the panels 132, 134 may be selected to achieve a desired amount of strength and/or stiffness. In addition, the gaps formed by the panels may also operate as an acoustic barrier to reduce the amount of noise from the track and/or engine as would be heard by a snowmobile operator.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined by reference to the claims that follow.

The embodiments of the invention in which an exclusive property or privilege is claimed are defined as follows:

1. A chassis for a snowmobile, the chassis comprising:
a front assembly including an engine cradle and front suspension mounts; and
a rear assembly coupled to the front assembly, the rear suspension assembly having a tunnel comprising:
an inner panel; and
an outer panel coupled to the inner panel, wherein a first region of the panels is arranged with the inner and outer panels being laterally spaced apart from each other while a second region of the panels is arranged with the inner and outer panels being in contact, wherein the inner and outer panels define a distance between them in the second region, and wherein the distance between the inner and outer panels is greater further from the first region.

2. The chassis of claim 1, wherein the inner and outer panels are configured to define an opening for receiving a spar of the front assembly.

3. The chassis of claim 1, wherein the first and second regions are arranged to provide a desired structural load path through a portion of the tunnel.

4. The chassis of claim 1, further comprising an integral rib formed in at least one of the inner and outer panels.

5. The chassis of claim 1, wherein at least one of the inner or outer panels includes an integral, reinforced region.

6. A chassis for a snowmobile, the chassis comprising:
a front assembly including an engine cradle and front suspension mounts;
a footrest coupled to at least one of the inner and outer panels; and
a rear assembly coupled to the front assembly, the rear suspension assembly having a tunnel comprising:
an inner panel; and
an outer panel coupled to the inner panel, wherein a first region of the panels is arranged with the inner and outer panels being laterally spaced apart from each other while a second region of the panels is arranged with the inner and outer panels being in contact, wherein the inner panel is coupled to the footrest, and wherein the footrest extends integrally from the inner panel.

7. A chassis for a snowmobile, the chassis comprising:
a front assembly including an engine cradle and front suspension mounts; and
a rear assembly coupled to the front assembly, the rear suspension assembly having a tunnel comprising:
an inner panel; and
an outer panel coupled to the inner panel, wherein a first region of the panels is arranged with the inner and outer panels being laterally spaced apart from each other while a second region of the panels is arranged with the inner and outer panels being in contact, wherein a track shaft opening in the tunnel extends through the first region of the panels and the second region is located generally above the track shaft opening.

8. The chassis of claim 7, wherein a portion of the first region that is located forward of the track shaft opening is configured to receive a spar of the front suspension assembly.

9. A chassis for a snowmobile, the chassis comprising:
a front assembly including an engine cradle and front suspension mounts; and
a rear assembly coupled to the front assembly, the rear suspension assembly having a tunnel comprising:
an inner panel; and
an outer panel coupled to the inner panel, wherein a first region of the panels is arranged with the inner and outer panels being laterally spaced apart from each other while a second region of the panels is arranged with the inner and outer panels being in contact, wherein the first region forms a structural cross section through the combination of the inner panel, a spatial gap, and the outer panel; and wherein the second region forms a structural cross section through the combination of the inner panel in contact with the outer panel, wherein the structural cross section of the first region forms approximately a box section having tapered portions.

10. A chassis tunnel for a snowmobile, the tunnel comprising:
a side inner panel; and
a side outer panel coupled to the side inner panel, wherein the panels form at least one structural region wherein the panels are laterally spaced apart from each other; the panels also forming a proximate structural region wherein the panels are in contact with each other, wherein in the structural region in which the panels are laterally spaced apart from each other the panels are nearer to one another nearer to the proximate structural region and further from one another further from the proximate structural region; and
an upper panel coupled to at least one of the side panels, the upper panel extending approximately in a lateral direction relative to the side panels.

11. The chassis of claim 10, wherein the upper panel extends continuously from the outer side panel.

12. The chassis of claim 10, further comprising a running board extending continuously from the side inner panel.

13. The chassis of claim 10, further comprising a running board secured to at least one of the side panels.

14. The chassis of claim 10, wherein the at least one structural region is located aft of a track shaft opening in the tunnel.

15. A chassis tunnel for a snowmobile, the tunnel comprising:
a side inner panel; and
a side outer panel coupled to the side inner panel, wherein the panels form at least one structural region wherein the panels are laterally spaced apart from each other; the panels also forming a proximate structural region wherein the panels are in contact with each other; and
an upper panel coupled to at least one of the side panels, the upper panel extending approximately in a lateral direction relative to the side panels, wherein the at least one structural region defines an opening for receiving a spar of a snowmobile front chassis assembly.

16. A chassis tunnel for a snowmobile, the tunnel comprising:
a side inner panel; and
a side outer panel coupled to the side inner panel, wherein the panels form at least one structural region wherein the panels are laterally spaced apart from each other; the panels also forming a proximate structural region wherein the panels are in contact with each other; and
an upper panel coupled to at least one of the side panels, the upper panel extending approximately in a lateral direction relative to the side panels, wherein the at least one structural region is located forward of a track shaft opening in the tunnel.

17. A method for making a chassis of a snowmobile, the method comprising:
obtaining an inner side panel that extends rearward relative to a direction of travel of the snowmobile, wherein a foremost portion of the inner side panel is located in front of a drive shaft cutout in a tunnel;
obtaining an outer side panel;
assembling the outer side panel with the inner side panel to form a sidewall, wherein at least one region of the sidewall includes the panels laterally spaced apart;
coupling an upper panel to one of the side panels; and
coupling a running board to one of the side panels.

18. The method of claim 17, wherein the assembling the side panels includes defining an opening between the side panels sized to receive a spar of a front chassis assembly having an engine cradle.

19. The method of claim 17, wherein obtaining the outer panel includes obtaining the outer panel with a track shaft cutout that cooperates with the track shaft cutout of the inner side panel.

20. The method of claim 19, wherein assembling the side panels includes locating the laterally spaced apart region of the sidewall aft of the track shaft cutout.

21. A chassis tunnel for a snowmobile, the tunnel comprising:
   an elongated inverted U-shaped member having spaced apart right and left first side panels with upper and lower portions and a top panel extending between the upper portions of the first side panels;
   right and left second side panels secured to the respective right and left first side panels, the right and left second panels having upper and lower portions, wherein at least at the lower portions thereof, the first panels are spaced from portions of the second panels forming right and left structural box regions; and
   right and left running boards extending outwardly from the lower portions of the first and second panels.

22. The chassis tunnel of claim 21, wherein the right and left structural box regions are shaped to receive chassis spars of a snowmobile front chassis assembly.

23. The chassis tunnel of claim 21, wherein the second side panels are secured at their upper portions to inside walls of the first side panels.

24. The chassis tunnel of claim 23, wherein the right and left running boards extend continuously from the right and left second side panels respectively, the lower portions of the first panels being secured to the running boards.

* * * * *